Figure 1:
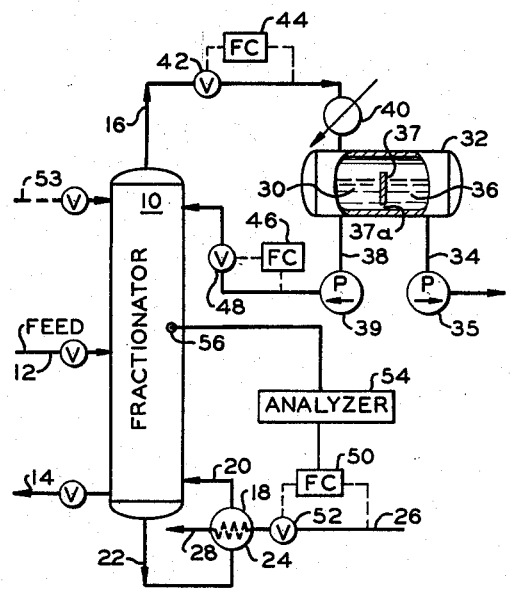

March 10, 1964 L. W. MORGAN 3,124,519
METHOD OF CONTROLLING FLUID IN PROCESS AND
AN ACCUMULATOR THEREFOR
Filed Aug. 15, 1958

INVENTOR.
L.W. MORGAN
BY *Hudson & Young*
ATTORNEYS

United States Patent Office 3,124,519
Patented Mar. 10, 1964

3,124,519
METHOD OF CONTROLLING FLUID IN PROCESS AND AN ACCUMULATOR THEREFOR
Lyman W. Morgan, Bartlesville, Okla., assignor to Phillips Petroleum Company, a corporation of Delaware
Filed Aug. 15, 1958, Ser. No. 755,329
17 Claims. (Cl. 202—40)

This invention relates to an improved process and apparatus for use in processing liquid streams and to an improved method of controlling liquid treating processes.

This application is a continuation-in-part of my application S.N. 631,198, filed December 28, 1956 and now abandoned.

In a number of processes in which liquids are treated, a portion of the overhead effluent from the processing chamber or vessel is recycled to the treating zone as reflux. A fractional distillation process for separation of compounds of different boiling points is typical of such processes. In fractional distillation a reflux stream is recycle from an accumulator in the overhead product line to a selected tray in the distillation column. When a change in feed composition or in operating conditions occurs, the composition of the overhead product changes and this is usually referred to as an upset (from standard overhead product composition) which requires a change in operating conditions to compensate for the original change. As fractional distillation systems are set up, the change in overhead stream composition is automatically reflected in a change in operating conditions when the reflux stream carries back to the column a stream of different composition (representing the change in overhead stream composition). However, the time lag between the original change or the change in the overhead and the return of changed reflux to the column and a reflection of this on control instruments is substantial so that the upset is exaggerated.

In any control system on such a column as a distillation column, the time lag is proportional to the liquid volume in the accumualtor, it being assumed that the feed line to the accumulator and the reflux line are of minimum length and volume. In conventional systems the overhead stream is admixed with the entire volume of product in the accumulator and the reflux is generally a representative sample of the resulting mixture. This means that, when an upset occurs, it takes a considerable period for the change in overhead stream composition to be represented in the reflux so that it effects a desired final correction in column operation following a step change upset.

In addition to the excessive time lag in correction of the distillation column operation, the entire accumulate is contaminated with the impure product and the purity of the final product is thereby reduced.

In a process for continuously mixing liquid streams to obtain a multicomponent mixture of uniform concentration of two or more components, it is conventional to pass the mixture in a continuous stream to a surge tank or accumulator and take a sample from the surge tank, analyze the same to determine the concentration of the components, and vary the rate of input of one of the streams to the mixing chamber so as to maintain a constant concentration of the components in the mixture. The sample stream is taken from a relatively large surge tank and is therefore not sensitive to immediate changes is the composition of the stream as it enters the surge tank and, hence, variations in the composition of the mixture are excessive.

Accordingly, a principal object of the invention is to provide an improved apparatus and method for effecting liquid treating processes. Another object is to provide apparatus for obtaining closer control of liquid treating processes utilizing reflux, such as in fractional distillation and liquid-liquid extraction. A further object of the invention is to provide more accurate control of a process in which product from a treating vessel is accumulated and a stream of accumulate is utilized in the control of the process. Other objects will become apparent from a consideration of the accompanying disclosure.

A broad aspect of the invention comprises an accumulator for a liquid treating process which is divided into two separate, connected chambers with feed entering one chamber and product being removed from the other chamber. The inlet chamber is preferably substantially smaller than the outlet chamber of the accumulator although some benefit is obtained when the two chambers are of approximately the same capacity. By designing the accumulator so that the inlet compartment is only a small portion of the total volume of the accumulator the takeoff stream from the inlet chamber is more nearly representative of the feed to the accumulator than is the case where the two chambers are of substantially the same size. The partition or baffle in the accumulator may be positioned so that the inlet chamber has a capacity in the range of 1 to 50 percent of the capacity of the accumulator and is preferably in the range of 1 to 25 percent thereof. It is also feasible to utilize separate vessels or tanks with a connecting line between as the inlet and outlet chambers of the accumulator.

The invention is best described and understood by the reference to the accompanying schematic drawing of which FIGURE 1 is a flow diagram of a specific arrangement of apparatus illustrating the invention and FIGURES 2 to 6, inclusive, represent flow diagrams of other embodiments of the invention.

Referring to FIGURE 1, a fractionating column 10 is provided with a feed inlet line 12, a bottom product outlet 14, and an overhead product line 16. A reboiler comprises a heat exchanger 18 provided with circulation lines 20 and 22 and with coil 24 supplied with steam by means of lines 26 and 28 from a heat source not shown.

Overhead product line 16 enters inlet chamber 30 of accumulator 32 and product withdrawal line 34, in which is positioned pump 35, is connected with chamber 36 of the accumulator. Baffle or partition 37 in accumulator 32 has one or more restricted openings in its lower section, such as 37a, and extends to a level below the top of the tank so that under some operating conditions flow over the partition is effected. Reflux line 38, in which is positioned pump 39, passes product back to the upper section of column 10 as reflux. A condenser 40 is positioned in line 16 intermediate the column and the accumulator. Flow in line 16 is controlled by means of valve 42 which is under the control of flow recorder controller 44 which provides constant flow in the overhead product line. Constant flow in reflux line 38 is effected by flow recorder controller 46 which operates valve 48 in line 38. The amount of heat supplied by reboiler 18 is controlled by flow recorder controller 50 which operates valve 52 in response to analyzer 54. Analyzer 54 is a conventional analyzer which is sensitive to the concentration of a component of the liquid on a selected tray in the fractionating column as at 56. An infra-red analyzer is conventional in many systems.

The operation of fractional distillation column 10 is conventional in every respect, except in the manner of obtaining the recycle stream and the sensitivity of the reflux stream to changes in composition in the overhead product in line 16 with unavoidable changes in operating conditions in the column and, particularly, with changes in the feed introduced thru line 12. The product in line 34 withdrawn as such or passed to another fractionating column operated in series with column 10 is less sensitive to changes in the composition of the overhead product in line 16 than is the case in conventional systems which do not maintain separate chambers in the accumulator and recycle reflux from the inlet chamber with only a relatively small proportion of the volume of the accumulate in chamber 30 passing into outlet chamber 36.

The operation of distillation columns is practiced with various control methods other than that illustrated in FIGURE 1, wherein constant flow is maintained in the overhead product line, and in the reflux line, and changes in the heat input to the column are made so as to maintain a liquid of substantially uniform composition or concentration of a specific component on a selected tray of the column. Distillation columns are operated by means of pressure regulation in the column or pressure differential between spaced vertical points within the column. In some applications the column is regulated by temperature control at one or more selected points in the column. These various methods of control are conventional and will not be discussed in detail herein. It should be understood that accumulator 32 is applicable to any distillation column regardless of the type of control utilized.

The apparatus shown in FIGURE 1 may be used in extractive distillation by passing solvent into column 10 thru auxiliary line 53, feed thru line 12, and reflux thru line 38, and withdrawing extract thru line 14 and overhead product thru line 16. The operation of such a system in extractive distillation, of course without the accumulator shown, is conventional.

Figure 2:
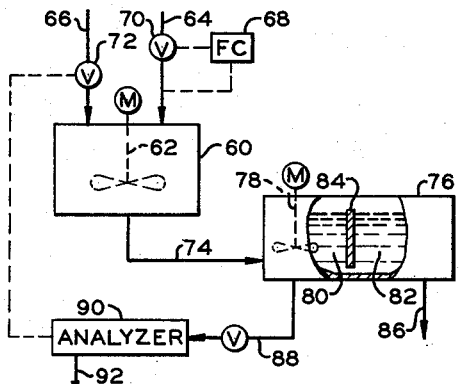

Referring to FIGURE 2, a mixing vessel 60 is provided with a stirrer or other mixing device 62 and with feed inlet lines 64 and 66. Vessel 60 must be of small volume in order to obtain the advantages of the invention. In fact a mixing-T is all that is required for this vessel, but a vessel small in relation to compartment 80 (identified below) may be utilized. A flow recorder-controller 68 operates valve 70 so as to maintain relatively constant flow therethru. A motor valve 72 is provided in line 66 for control of the flow in this line as hereinafter described. Effluent line 74 from mixing vessel 60 passes mixture to accumulator 76, which is provided with a stirrer 78 and is divided into compartments 80 and 82 by partition or baffle 84. Effluent line 86 passes mixed product from chamber 82 to further treating or storage as desired. Line 88 passes a small sample stream of mixture from chamber 80 to analyzer 90 which automatically determines the concentration of one of the components in the mixture and varies the flow of liquid in line 66 by operation of valve 72 to correct errors in composition in line 74. Effluent sample from analyzer 90 is passed via line 92 back into the system at any selected point or is disposed of in any suitable manner.

The system shown in FIGURE 2 is readily adaptable with advantage to various mixing processes where a product of uniform concentration of two or more components is desired. Chamber 80 is preferably made small in comparison with chamber 82 so as to render the sample in line 88 more representative of the mixture in line 74 than would be the case if sample were removed from an accumulator of substantial size without separation into an inlet compartment and an outlet compartment. Chamber 80 can be made as small or even smaller than one percent of the total volume of the accumulator in order to increase the sensitivity of the analysis to changes in product composition and therefore the control (thru operation of valve 72) of the composition of the stream in line 74.

A specific application of the system shown in FIGURE 2 is in the blending or mixing of styrene and butadiene to provide a specific monomer ratio in the finished polymer from a synthetic rubber plant. In such a system it was found desirable to utilize a 7,500 gallon tank as an accumulator or surge tank and that withdrawing a sample stream from this size tank for analysis in the refractometer (instrument 90) introduced such a time lag in the control system as to produce substantial variations in the monomer ratio in the finished polymer. By dividing the accumulator into a small inlet chamber and a large outlet chamber, the sensitivity of the control system is substantially improved with more uniform monomer ratio in the finished polymer. Providing a 200 gallon compartment in the inlet end of the 7500 gallon accumulator renders the control system satisfactorily sensitive. The same result is obtainable by utilizing two tanks, one of 200 gallon capacity, and the other of 7,300 gallon capacity.

Figure 3:
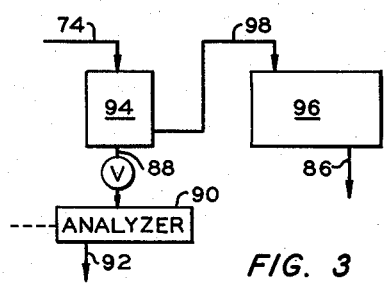

FIGURE 3 shows another embodiment of the invention illustrated in FIGURE 2 wherein tank 94 is comparable to chamber 80 and tank 96 is comparable to chamber 82. Tanks 94 and 96 are connected by line 98 as shown or by another suitable arrangement.

The invention illustrated in the foregoing figures is adapted to function in processes which in normal operation receive a portion of the product of the process as feedback as in a distillation column or in several distillation columns operated in series. It is designed to control the propagation of disturbances fed back to a process and also disturbances passed on from a process in one column to the next column so as to not only influence the recovery of the process from disturbances which arise, either in the process itself or in the feed to the process, but also to influence the degree of isolation of temporary changes of the product of the process from any subsequent process.

Figure 4:
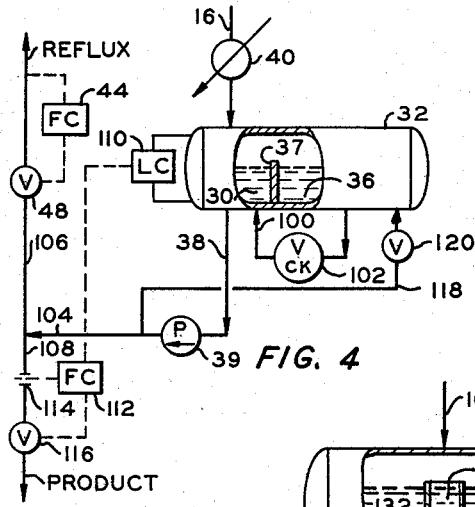

FIGURE 4 illustrates a flow diagram and arrangement of apparatus which does not effect the same control of the propagation of disturbances to a downstream process as that of FIGURE 1 but is advantageous where the condensate is merely passed to a storage tank or a product pipe line. In this arrangement the partition 37 is imperforate and extends completely to the bottom of the accumulator 32 with provision for flow from chamber 30 to chamber 36 over the top of the baffle. A line 100 containing a check valve 102 connects chamber 30 with chamber 36 and permits flow from the latter to the former when flow of condensate into chamber 30 decreases to a lower rate than the reflux rate in line 38 or is temporarily halted. Condensate for reflux and product is removed thru line 38 by means of pump 39 and is passed thru line 104 to line 106 as reflux and to line 108 as product. A liquid level controller 110 on accumulator 32 senses the liquid level therein and is connected with flow rate controller 112 which senses the flow rate in orifice 114 and controls valve 116 so as to maintain a desired liquid level in chamber 30. The rate of reflux in line 106 is controlled in the same manner as that in FIGURE 1. Line 118 connects chamber 36 of the accumulator with line 104 downstream of pump 39 and is provided with valve 120. In starting up operations, starting time is decreased and control is improved by closing valve 120 until the fractionator is operating on specification at which time valve 120 is opened sufficiently to fill chamber 36 with on-specification material. This provides surge volume which automatically supplies chamber 30 during infrequent times of low condensate flow or when condensate flow is interrupted. Valve 120 is opened to permit filling of vessel 36 at any time when the level therein is below the optimum level and is closed when not filling this vessel. In normal operation both product and reflux can be taken from the condensate in vessel 30 without any flow of stored product from vessel 36 or valve 120 can be cracked to cause continual "roll over" of stored product to prevent ageing.

Figure 5:
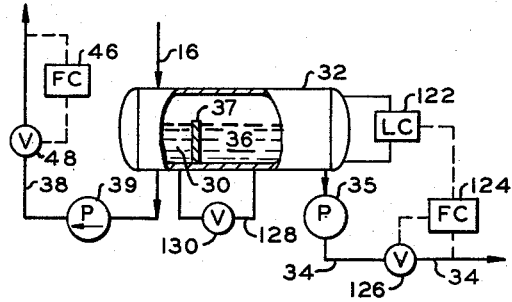

In FIGURE 5, the partition 37 is similar to that in FIGURE 4 and the take-off and flow of reflux is controlled the same as in FIGURE 1. Product take-off is effected by pump 35 in line 34 and controlled by means of a liquid level controller 122 connected with a flow rate controller 124 which is sensitive to the flow rate in line 34 and is in control of valve 126. Line 128 connects compartment 30 with compartment 36 in tank 32 and is provided with a shut-off valve 130 which is closed during starting-up operation to permit condensate to build up in section 30, but is normally open so that the condensate is free to flow thru line 128 in either direction. Obviously most of the flow thru line 128 is into section 36 but, when the condensate flow in line 16 is interrupted for any reason, the condensate in section 36 provides surge volume for reflux from section 30.

Figure 6:
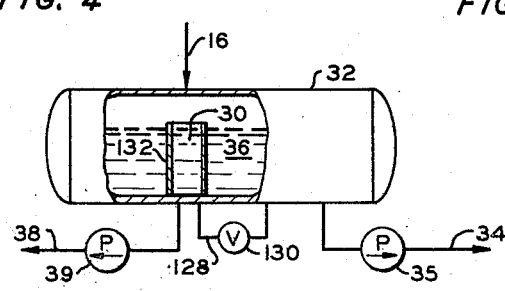

The accumulator of FIGURE 6 utilizes an upright pipe or conduit 132 sealed at the lower end from the surrounding compartment 36 so as to provide a small compartment or section 30. With this arrangement, compartment or section 30 may be of extremely small volume compared with the volume of section 36 of the tank. In fact the ratio of the volume of section 36 to the volume of section 30 may be as great as 1000 to 1 and even higher. Pipe or conduit 132 may range in diameter from about 3 to about 30 inches.

It is to be understood that the conduit arrangement of 132 as illustrated in FIGURE 6 may be utilized in the accumulator of FIGURE 4 or of FIGURE 5 and that the check valve 102 of FIGURE 4, together with line 118 and valve 20 may be utilized with the product take-off arrangement and reflux arrangement of FIGURE 5.

It is feasible to perforate pipe 132 adjacent its lower end so that it operates in a manner similar to the operation of baffle 37 in FIGURE 1. Tank 32 of FIGURE 6 may be an upright cylinder so that section 36 thereof is an annulus concentric with pipe 132.

In a large commercial plant making butadiene of 98% purity at the rate of about 6,000 tons per month as disclosed in U.S. Patent 2,750,435, issued to John Fetchin, a butadiene-rich stream of 85 percent purity is passed to a fractionating column from which an overhead stream of 98 percent purity is recovered. The reflux accumulator utilized in the fractionation system is approximately 21 feet in diameter and 42 feet long. The reflux accumulate is liquid-level controlled so that the accumulator is about one half full of liquid, amounting to a liquid volume of 17,700 gallons in the accumulator. The butadiene product in the overhead amounts to 5,760 gallons per hour and with a reflux ratio of seven, the total condensate entering the accumulator amounts to about 46,000 gallons per hour. The time constant for this process is 17,700 gal./46,080 gallons per hour which amounts to 0.384 hour or 23 minutes. This 23 minute period applies to both the reflux and the product make. In other words the time lag in correcting upsets is 23 minutes. By utilizing in the accumulator a feed inlet chamber in accordance with the invention of a size which holds about 800 gallons of accumulate at the level at which the liquid is maintained therein, the time delay in the return of the reflux to the column is reduced to the order of one minute. This has the effect of smoothing out the operation of the distillation column and, also, of decreasing the amount of variation in product purity. In actual operation in the plant, the butadiene distillation column is operated to produce butadiene of 98.2 percent purity because of the errors which this invention is designed to minimize thereby insuring a product of 98.0 percent purity to meet specifications. By operating in accordance with the invention as described herein, it is possible to detect errors sooner and as a result operation can be geared to obtain a product of 98.05 percent purity with a substantial reduction in cost of operation.

Certain modifications of the invention will become apparent to those skilled in the art and the illustrative details disclosed are not to be construed as imposing unnecessary limitations on the invention.

I claim:

1. An accumulator for receiving a processed liquid stream from a treating vessel comprising a tank having a first chamber and a laterally adjacent second chamber separated by a partition providing fluid flow over the top but closing the lower section of the tank to flow between chambers, said second chamber being at least as large as said first chamber; as the sole inlet to said accumulator, a fluid inlet to said first chamber; a separate fluid outlet from each of said chambers; and a fluid conduit connecting said chambers and having a check valve therein permitting flow only from the bottom of said second to the bottom of said first chamber.

2. An accumulator for receiving a processed liquid stream from a treating vessel comprising a tank having a first chamber and a laterally adjacent second chamber separated by a partition providing liquid flow from said first to said second chamber over the top of said partition, said second chamber being at least as large as said first chamber; as the sole inlet to said accumulator, a fluid inlet leading into the upper section of said first chamber; a separate outlet in the bottom of each said chambers; a separate line leading from each said outlet having a flow control means therein.

3. The accumulator of claim 2 wherein said chambers comprise compartments in a horizontally elongated tank separated by an upright partition extending transversely across said tank.

4. The accumulator of claim 2 wherein said partition closes the lower section of said tank to flow from one chamber to the other and permits flow between said chambers over its upper edge and including a fluid conduit connecting the lower sections of said chambers to permit flow from the lower section of one chamber to the lower section of the other.

5. The accumulator of claim 4 including a liquid level controller sensitive to a level in said tank and in actuating control of the flow control means in the line from the outlet of one of said chambers.

6. The accumulator of claim 5 wherein said liquid level controller is sensitive to a liquid level in said second chamber and said flow control means is in the fluid outlet line from said second chamber.

7. The accumulator of claim 2 wherein said partition separates the lower sections of said chambers and the flow control means in the line from the outlet of said first chamber comprises a pump, and further including a fluid conduit connecting the bottom of said first chamber with the bottom of said second chamber; a reflux line and a product take-off line connecting with the line from the outlet of said first chamber downstream of said pump; a liquid level controller sensitive to a liquid level in said first chamber; a flow control valve in said product take-off line actuated by said level controller; and a flow control valve in said reflux line.

8. The apparatus of claim 7 wherein the line from the outlet of said second chamber connects with the line from the outlet of said first chamber intermediate said pump and said reflux and product take-off lines.

9. The accumulator of claim 2 wherein said partition comprises an upright imperforate pipe in said tank open at its upper end into the surrounding tank, forming a relatively small cylindrical first chamber and a relatively large outer second chamber.

10. An accumulator for receiving an effluent stream of treated liquid from a treating vessel and providing a reflux stream to be returned to said vessel comprising a two-chambered tank having a first chamber and a second chamber laterally spaced apart and separated by an upright partition extending completely across said tank horizontally but providing liquid flow between the lower sections of said chambers and vapor flow between the upper sections thereof, said second chamber being at least as large as said first chamber; a feed inlet in the wall of said tank leading into an upper section of said first chamber for introducing said treated liquid; a reflux outlet in the wall of said tank leading from a lower section of said first chamber for withdrawing said reflux stream; and an outlet in the wall of said tank leading from said second chamber for withdrawing a product stream.

11. The accumulator of claim 10 wherein said first chamber has a capacity in the range of 1 to 50 volume percent of the tank.

12. The accumulator of claim 10 wherein the capacity of said first chamber is in the range of 1 to 25 volume percent of the tank volume.

13. The accumulator of claim 10 wherein said feed inlet is in the top of said first chamber, said reflux outlet is in the bottom of said first chamber, and said outlet from said second chamber is in the lower section thereof.

14. An accumulator for receiving a stream of treated liquid and providing a sample stream and a product stream comprising a horizontally elongated tank having an upright partition therein extending transversely across said tank so as to divide same into a first chamber and a second chamber at least as large as said first chamber; a liquid passageway between said chambers under said partition; a vapor passageway between chambers over said partition; a feed inlet for said treated liquid in an upper section of said first chamber; an outlet from a lower section of said first chamber for withdrawing said sample stream; and an outlet in a lower section of said second chamber for withdrawing said product stream.

15. The accumulator of claim 14 wherein said partition is spaced from the top and bottom of said tank to form said passageways.

16. A method of controlling a process in a liquid treating vessel in which variations in treating conditions occur which effect a change in the effluent stream from said vessel and wherein a reflux stream is passed from an accumulator downstream from the treating vessel back to said vessel, which comprises mixing said effluent stream, as it enters said accumulator, with only a separated portion of the treated liquid therein in a restricted separate first section of said accumulator; passing liquid from said first section to a separate second section of said accumulator; and withdrawing said reflux stream directly from said first section so as to decrease the time lag between a change in said effluent stream and a return to the vessel of a portion of the changed stream.

17. In a method of controlling a process in which a liquid product from a treating vessel is passed to an accumulator and a portion of the accumulate is withdrawn, analyzed, and the analysis is utilized to control said process, the improvement comprising passing said product directly into a separate first zone of said accumulator; passing the product from said first zone to a separate second product withdrawal zone in said accumulator larger than said first zone thereby mixing said product in said first zone with only a minor proportion of the total accumulate; withdrawing a stream from the resulting mixture; and utilizing the resulting stream in the analysis step.

References Cited in the file of this patent
UNITED STATES PATENTS

| | | |
|---|---|---|
| 417,452 | Voltz | Dec. 17, 1889 |
| 1,202,969 | Cornell | Oct. 31, 1916 |
| 1,258,479 | Shelly | Mar. 5, 1918 |
| 1,407,136 | Ehrhart | Feb. 21, 1922 |
| 1,921,157 | Heath et al. | Aug. 8, 1933 |
| 1,925,833 | French | Sept. 5, 1933 |
| 2,168,875 | Noll | Aug. 8, 1939 |
| 2,350,006 | Wolfner | May 30, 1944 |
| 2,684,326 | Boyd | July 20, 1954 |
| 2,725,351 | Grote | Nov. 25, 1955 |
| 2,813,594 | Gantt | Nov. 19, 1957 |
| 2,826,306 | Burns | Mar. 11, 1958 |
| 2,900,312 | Gilmore | Aug. 18, 1959 |

FOREIGN PATENTS

| | | |
|---|---|---|
| 160,881 | Austria | Sept. 24, 1942 |
| 846,303 | Germany | Aug. 11, 1952 |

OTHER REFERENCES

Boyd, "Fractionation Instrumentation and Control (Part II)," Petroleum Refiner, volume 27, No. 11, November 1948.